(12) United States Patent
Hellbach et al.

(10) Patent No.: US 12,030,990 B2
(45) Date of Patent: Jul. 9, 2024

(54) POLYKETONE COMPOUND

(71) Applicant: Carl Freudenberg KG, Weinheim (DE)

(72) Inventors: Bjoern Hellbach, Birkenau (DE); Marco Sutter, Weinheim (DE); Roland Fietz, Neustadt-Momberg (DE); Thomas Schauber, Weinheim (DE)

(73) Assignee: CARL FREUDENBERG KG, Weinheim (DE)

( * ) Notice: Subject to any disclaimer, the term of this patent is extended or adjusted under 35 U.S.C. 154(b) by 679 days.

(21) Appl. No.: 17/283,960

(22) PCT Filed: Oct. 2, 2019

(86) PCT No.: PCT/EP2019/076716
§ 371 (c)(1),
(2) Date: Apr. 9, 2021

(87) PCT Pub. No.: WO2020/074349
PCT Pub. Date: Apr. 16, 2020

(65) Prior Publication Data
US 2021/0395453 A1    Dec. 23, 2021

(30) Foreign Application Priority Data

Oct. 10, 2018  (DE) .......................... 102018125067.3

(51) Int. Cl.
*C08G 67/02* (2006.01)
*C08L 23/06* (2006.01)

(52) U.S. Cl.
CPC .............. *C08G 67/02* (2013.01); *C08L 23/06* (2013.01); *C08L 2207/068* (2013.01)

(58) Field of Classification Search
USPC ....................................................... 528/392
See application file for complete search history.

(56) References Cited

U.S. PATENT DOCUMENTS

| | | |
|---|---|---|
| 2,495,286 A | 1/1950 | Brubaker |
| 3,689,460 A | 9/1972 | Nozaki |
| 3,694,412 A | 9/1972 | Nozaki |
| 4,818,810 A | 4/1989 | Drent |
| 4,921,937 A | 5/1990 | Drent |
| 5,859,129 A | 1/1999 | Bonner |
| 7,803,897 B2 | 9/2010 | Jang |

FOREIGN PATENT DOCUMENTS

| | | | |
|---|---|---|---|
| CN | 107739501 A | * | 2/2018 |
| CN | 107739501 A | | 2/2018 |
| DE | 695 13 864 T2 | | 4/2000 |
| JP | H101604 A | | 1/1998 |
| WO | WO 96/06889 A1 | | 3/1996 |

OTHER PUBLICATIONS

Engineering Thermoplastics; George H. Melton, et al., in Applied Plastics Engineering Handbook section 2.17, 2011. (Year: 2011).*
CN-107739501-A Machine Translation (Year: 2018).*
Kenneth Budinski, "Engineering. Materials, properties and selection" Jan. 2005, p. 137-182, Pearson Education, London.

* cited by examiner

*Primary Examiner* — Terressa Boykin
(74) *Attorney, Agent, or Firm* — LEYDIG, VOIT & MAYER, LTD.

(57) ABSTRACT

An aliphatic polyketone compound including 85.0 to 99.5 wt % aliphatic polyketone and 0.5 to 15.0 wt % ultra-high molecular weight polyethylene. An aliphatic polyketone compound described where the ultra-high molecular weight polyethylene is 2.0 to 8.0 wt %. An aliphatic polyketone compound where the ultra-high molecular weight polyethylene has a molecular weight greater than 1.0 million g/mol.

19 Claims, 2 Drawing Sheets

POLYKETONE COMPOUND

CROSS-REFERENCE TO PRIOR APPLICATIONS

This application is a U.S. National Phase application under 35 U.S.C. § 371 of International Application No. PCT/EP2019/076716, filed on Oct. 2, 2019, and claims benefit to German Patent Application No. DE 10 2018 125 067.3, filed on Oct. 10, 2018. The International Application was published in German on Apr. 16, 2020 as WO 2020/074349 under PCT Article 21(2).

FIELD

The invention relates to a polyketone compound based on aliphatic polyketones, in particular a polyketone compound having improved tribological properties. The invention further relates to a method for producing the polyketone compound, to the use thereof for producing molded bodies, in particular seals, and also to molded bodies which contain the polyketone compound.

BACKGROUND

Aliphatic polyketones are linearly structured polymers which are produced from carbon monoxide and α-olefins, wherein the arrangement of the monomeric units in the polymeric chain is strictly alternating.

This class of polymers was first mentioned in the works of Walter Reppe in 1940 and the works of Merlin M Brubaker, who, in the 1950s, was involved at DuPont in the interpolymerization of carbon monoxide into unsaturated substances, such as aliphatic monoolefins and fluorinated ethylenes (inter alia U.S. Pat. No. 2,495,286). The industrial synthesis of aliphatic polyketones was developed, optimized and patented (inter alia U.S. Pat. Nos. 3,689,460; 4,818,810; 4,921,937) by employees of the Shell Oil Company under the management of Eit Drent in the last three decades of the twentieth century. The polymerization can take place either in methanolic suspension or via gas phase reaction with immobilized catalysts (inter alia Drent, E.; Mul, W. P.; Smaardijk, A. A. (2001); "Polyketones"; *Encyclopedia Of Polymer Science and Technology* and Bianchini, C. (2002); "Alternating copolymerization of carbon monoxide and olefins by single-site metal catalysts"; *Coord. Chem. Rev.* 225: 35-66). As catalysts or precursors thereof, palladium(II) complexes are predominantly used (inter alia U.S. Pat. Nos. 3,689,460; 3,694,412; 4,818,810; Sen, A.; Lai, T. W. (1982); "Novel palladium(II)-catalyzed copolymerization of carbon monoxide with olefins"; *J. Am. Chem. Soc.* 104 (12): 3520-3522; Drent, E.; Budzelaar, P. H. M. (1996); "Palladium-Catalyzed Alternating Copolymerization of Alkenes and Carbon Monoxide"; *Chem. Rev.* 96 (2): 663-682). The mechanism for palladium catalysis in methanolic suspension was investigated by Maurice Brookhart (Rix, F. C.; Brookhart, M.; White, P. S. (1996) "Mechanistic Studies of the Palladium(II)-Catalyzed Copolymerisation of Ethylene with Carbon Monoxide"; *J. Am. Chem. Soc.* 118 (20): 4746-4764) using the example of a palladium(II) phenanthroline catalyst.

From 1996, aliphatic polyketones were available commercially for the first time, and in larger quantities from Shell under the trade name Carilon®. In 2003, the company Hyosung in South Korea began research into aliphatic polyketones (inter alia U.S. Pat. No. 7,803,897). Since 2015, Hyosung has been producing aliphatic polyketones under the trade name POKETON® on a semi-continuous plant with an annual capacity of 50,000 tonnes per year.

Nowadays, Hyosung produces virtually exclusively polyketone terpolymers instead of the conventional polyketone copolymers (FIG. 1) which are produced only from carbon monoxide and ethylene. These polyketone terpolymers are produced from carbon monoxide, ethylene and preferably small quantities of propylene.

In some cases, longer-chain α-olefins, such as 1-butylene, are also used as termonomer.

The reason for the use of terpolymers instead of copolymers lies in the considerably reduced brittleness of the terpolymers. Due to their polymer chain, which is built up in a strictly alternating manner with an extremely low defect rate (one defect per million monomeric units; see Rix, F. C.; Brookhart, M.; White, P. S. (1996) "Mechanistic Studies of the Palladium(II)-Catalyzed Copolymerisation of Ethylene with Carbon Monoxide"; *J. Am. Chem. Soc.* 118 (20): 4746-4764) and also the high number of polar keto groups, polyketone copolymers consisting of carbon monoxide are highly crystalline, very hard but also very brittle, which considerably limits their possible applications as a polymeric material. By the addition of small quantities of propylene (approximately 5%) during synthesis, it has been possible to disrupt the crystallinity such that the melting point is lowered from 255° C. (copolymer of carbon monoxide and ethylene) to 220° C. (terpolymer) and an extremely tough, rather than brittle, polymer is obtained.

Aliphatic polyketone terpolymers have a degree of crystallinity of approximately 30% and are characterized by good mechanical properties which, in contrast to polyamides, for example, are largely unaffected by moisture. According to ISO 527-1/2, the tensile modulus of elasticity of unmodified polyketones is approximately 1400 to 1500 MPa. The elongation at yield thereof, according to ISO 527-1/2, is approximately 25%, and in comparison with other technical plastics they can withstand a larger number of deformation cycles up to the yield point without plastic deformation. Furthermore, they exhibit ductile behavior over a wide temperature range, with elongations at break of more than 300% being achievable. The Charpy impact strength for an unfilled, unmodified polyketone terpolymer, according to standard ISO 179-1/1 eil, is so high that no breakage takes place both at 23° C. and at −30° C. The Charpy notched impact strength, according to standard ISO 179-1/1eA, is, depending on the polymer chain length, between 10 and 15 KJ/m² at a temperature of 23° C. and between 3.5 and 4.5 KJ/m² at a temperature of −30° C.

Furthermore, aliphatic polyketones have excellent chemical resistance, in particular to apolar solvents, for instance aliphatic or aromatic hydrocarbons. Aliphatic polyketones also have very good resistance to water or dilute bases and acids. Storage tests in water at 80° C. for a period of 25 days gave, for example, a weight increase of only 2.5 wt % and an increase in yield stress of 1.3 MPa. In addition, storage in 1% hydrochloric acid or 1% sodium hydroxide solution for a period of 25 days at 80° C. did not give rise to any impairment in the characteristic mechanical values. Only strong acids or bases can lead to degradation of aliphatic polyketones over time.

The aliphatic polyketones from Hyosung are further refined by different compound manufacturers and are commercially available under various trade names, for instance AKROTEK® PK (AKRO-PLASTIC GmbH), Schulaketon® (A. Schulman GmbH), WITCOM PK (Witcom Engineering Plastics B.V.) or SUSTAKON® (Rochling Sustaplast SE & Co. KG). By compounding with particular additives, selected properties of the aliphatic polyketones can be further improved or modified. By way of example, mention may be made here of the stiffening of the polymer with short-cut glass fibers (e.g. in the commercial products AKROTEK® PK-VM GF15, AKROTEK® PK-VM GF30, AKROTEK® PK-VM GF50, Schulaketon® GF15, Schulaketon® GF30, Ketoprix™ EKT33G2P, Ketoprix™ EKT33G2P, etc.) or short-cut carbon fibers (e.g. in the commercial products AKROTEK® PK-HM CF12 black, TECACOMP® PK TRM CF20 black, etc.) and also imparting flame-retardant properties (e.g. in the commercial products AKROTEK® PK-VM GF20 FR black, Schulaketon® HV 4DE, etc.).

The tribological properties of aliphatic polyketones are also good, which makes them interesting for sealing applications, inter alia. Thus, experiments by the University of Lubeck on a universal tribometer (pin plate, plate: 100Cr6, load: 2.5 MPa, stroke: 1.8 mm, Ra=0.42, sliding movement: 46 Hz) show, for example, that aliphatic polyketones with an MVR of 60 g/10 min have a coefficient of friction of 0.33 and a specific wear rate of $0.8*10^6$ mm³/Nm. However, in order to be able to meet the high requirements for the tribological properties, as are necessary, for example, for certain seals, tribological additives must often additionally be used. In use, these additives then form a release film between the surfaces of polymer and counterface, which is capable of withstanding considerable force effects during rolling or sliding contact over a longer period of time. In commercial products, virtually exclusively PTFE powder or PTFE powder/silicone oil combinations are found in this regard: for example in AKROTEK® PK-VM™, AKROTEK® PK-HM™, TECACOMP® PK TRM TF10, Witcom PK/3L1 and Witcom PK-3L3.

A further significant advantage of aliphatic polyketones (both copolymers and terpolymers) is that they can be thermoplastically processed.

Against this background, it would be desirable to use aliphatic polyketones for seals, since despite their hardness they still have a certain elasticity and have a high extrusion resistance and good tribological properties. They would be particularly interesting for rotationally symmetrical elements, for example rod seals, piston seals and wipers, and in particular as a possible replacement for rod and piston seals made of PTFE, PTFE bronze and PTFE glass fibers, since the latter, as explained in more detail below, are unsuitable for use in injection molding. Here, a changeover in materials from PTFE, PTFE bronze or PTFE glass fibers to an injection-moldable aliphatic polyketone would mean a significant advantage in terms of production methods, production time and production costs. Rod seals are primarily used in pneumatic and hydraulic cylinders and the purpose thereof is to seal off the extending and retracting cylinder rod. The aim is to prevent the pressurized operating medium from escaping from the cylinder. At the same time, said medium must be protected from external impurities (wiper). Conversely, the purpose of piston seals is to seal the piston against the cylinder tube and to ensure the movement thereof efficiently and with minimal friction.

At present, both rod seals and piston seals are commonly made of PTFE, PTFE bronze compounds, or PTFE glass fiber compounds, since these materials generate low friction and allow stick-slip-free running. However, because of their comparatively high modulus of elasticity, PTFE seals can no longer be radially compressed as a whole between the rod surface or piston surface and the base of the groove. Rather, their contact pressure must first be generated by expanding the seal and then additionally reinforced by an elastomer seal, typically an O-ring. The O-ring, often referred to as a clamping ring, pressure element or energizer, additionally acts as an auxiliary seal. Since a PTFE sealing ring has a high extrusion resistance, it can also be used at high pressure without a supporting ring.

Although thermoplastic, PTFE and modified PTFE, due to the extremely high molecular weight and high melt viscosity, cannot be processed from the melt like other thermoplastics but only by means of various pressing and sintering techniques. Seals made of PTFE or PTFE compounds are therefore produced in a complex manner by the following method. The pulverulent polymer is pressed at room temperature to give a preform, also called a "green body". In this case, the loose powder bed is compressed and compacted with a particular pressing force. The maximum pressing force depends on the nature of the powder and can lie in a range from 150 bar for the non-pourable S-PTFE type, for example, up to 800 bar for PTFE compounds. The pressing operation is usually effected slowly, uniformly and without interruptions. Once the maximum pressure has been reached, this must be held for a certain time (pressure dwell time) in order to allow particle flow and in order to relieve internal stress peaks or irregularities. After a slow decompression, the pressed part is ideally stored for a certain period of time in a stress-free manner, in order to enable further venting or stress compensation. After pressing, the pressed parts are exposed to a defined sintering cycle. In this case, a defined heating adapted to the pressed part takes place, and finally a time-controlled sintering at a maximum temperature of 370 to 380° C. takes place in a controlled sintering furnace. After exceeding the crystallization melting point at approximately 342° C., the PTFE transitions to the amorphous state and the previously compacted powder particles sinter together to form a homogeneous structure. Particularly in the case of larger pressed parts, slowly passing through the melting temperature range is recommended, since a disproportionate increase in the volume of the material takes place in this range and large stresses may potentially arise. In spite of the melting/gel point being reached or exceeded, the sintering of the pressed parts takes place in what is referred to as a "mold-free" manner, since the gel stability of PTFE is very high on account of the high molecular weight.

From the preceding description for the production of seals made of PTFE or PTFE compounds, such as PTFE bronze, it is clear that the manufacturing effort is very high and is associated with high costs.

It would therefore be highly advantageous if aliphatic polyketones could be used for rotationally symmetrical seals, in particular for rod and piston seals, since said aliphatic polyketones have outstanding mechanical properties and, in contrast to the PTFE or PTFE compounds conventionally used, can be processed using the injection molding process.

In practical experiments, however, it has been found that this is not readily possible. This is because an essential criterion of rotationally symmetrical seals is their weld line strength, as set forth below. Rod and piston seals produced from aliphatic polyketone/PTFE compounds do have comparable tribological properties and result in comparable leakage values to rod and piston seals made of PTFE, PTFE bronze or PTFE glass fiber, but because of poor weld line strength they are not suitable for use as rod or piston seals or similar rotationally symmetrical seals.

When using thermoplastic materials, rotationally symmetrical seals are typically produced by means of the plastic injection molding process. In order to achieve the filling of such rotationally symmetrical cavities, there are several possibilities, for example A) ring gates or cone gates, B) pin-point gates or tunnel gates, or C) hot runner systems.

Cone gates or ring gates (A) have the disadvantage that the gate geometries have to be separated from the actual annular product by downstream operations, which causes corresponding costs. Therefore, these gate variants are usually used only in exceptional cases for efficient production.

The pin-point or tunnel gate (B) has become established as a more modern and more cost-effective manufacturing variant. In this case, as a rule, the plastic is allowed to enter the cavity via a single injection point. Products produced in this way generally require no subsequent work, since the product is already separated from the gate geometries during ejection from the injection molding machine (ready-to-use). To put it another way, the gate shears itself off.

However, such laterally injection-molded products usually have what is referred to as a confluence point (weld line) on the opposite side to the injection point, that is to say a point at which the melt fronts converge. This weld line can represent a weak point and lead to a predetermined breaking point in the plastic product. How well the product is held together at the weld line is determined by factors such as injection pressure, melt temperature and mold temperature, but also by the material selection and the influence of additives.

In practical experiments, it was found that the commercially available PTFE-filled polyketone compounds, for example AKROTEK® PK-VM™, TECACOMP® PK TRM TF10, Witcom PK/3L1 and Witcom PK-3L3, lead to a markedly reduced weld line strength in injection-molded seals, and so the components break at the weld line even with low application of force and are therefore less suitable for the pin-point or tunnel gate processes. In application tests, it has also been found that rod seals injection molded from PTFE-filled polyketone compounds, such as AKROTEK® PK-VM™, break at the weld line when installed in the cylinder, since the rigid seals have to be greatly deformed by means of mounting pliers.

In the case of rod seals produced from commercial Tribo-PK compounds, this deformation leads to breakage at the weld line.

SUMMARY

In an embodiment, the present invention provides an aliphatic polyketone compound comprising 85.0 to 99.5 wt % aliphatic polyketone; and 0.5 to 15.0 wt % ultra-high molecular weight polyethylene.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a polyketone compound which can be processed by injection molding and is characterized by a high weld line strength. Moreover, the polyketone compound should exhibit the good tribological properties necessary for sealing applications, and a high extrusion resistance.

In an embodiment, the present invention provides an aliphatic polyketone compound comprising 85.0 to 99.5 wt % aliphatic polyketone and 0.5 to 15.0 wt % ultra-high molecular weight polyethylene.

The term "compound" is understood according to the invention in the conventional sense as a plastic which contains at least two polymers which cannot be blended together or as a plastic which, in addition to the polymer, contains fillers, reinforcing substances or other additives, for example tribological additives, which form a polyphase system with the polymer. The polyketone compound according to the invention contains, with the aliphatic polyketone and the ultra-high molecular weight polyethylene, at least two polymers which cannot be blended together.

In contrast thereto, blends have a combination of two or more polymers that are physically mixed (blended). Homogeneous blends have a single phase. Heterogeneous blends have at least two phases. Homogeneous blends no longer exhibit the properties of the separate polymers, but rather have their own, new properties, which can sometimes differ considerably from those of the original polymers (see Kulshreshtha, A. K. (2002) "Handbuch zu Polymermischungen und Verbundstoffen (Vol. 1)" [*Handbook of polymer blends and composite materials*], iSmithers Rapra Publishing, or Sperling, L. H. (2005) "Einführung in die physikalische Polymerwissenschaft" [*Introduction to physical polymer science*], John Wiley & Sons).

According to the invention, it was found that incorporating 0.5 to 15 wt % ultra high-molecular weight polyethylene into aliphatic polyketones made it possible to improve the tribological properties thereof in terms of friction and wear in such a way that they are comparable to those of the commercially available friction-modified polyketone compounds, but at the same time have a significantly better weld line strength and a high extrusion resistance.

As explained above, the weld line strength of the polyketone compound according to the invention, which is improved compared with the commercially available PTFE friction-modified aliphatic polyketone compounds, is particularly advantageous since it makes it possible, for example, to produce seals by means of a modern and cost-effective variant of the injection molding process in which only one injection point is used. The products obtained in the process are characterized by a high extrusion resistance. This is advantageous in particular for dynamic sealing applications, since otherwise extrusion barbs form over the service life of the seals and leakage or premature failure of the seal can occur as a result. At the same time, the aliphatic polyketone compounds according to the invention have sliding and frictional properties which are virtually comparable to those of PTFE, PTFE/bronze compounds or those of commercially available PTFE friction-modified polyketone compounds. Surprisingly, it has been found that 0.5 to 15 wt %, more preferably 2.0 to 8.0 wt % and in particular 5.0 to 7.5 wt % of the ultra-high molecular weight polyethylene, in each case based on the total weight of the polyketone compound, is already sufficient to match up to the sliding and frictional properties of an aliphatic polyketone filled with 20 wt % PTFE. Furthermore, it was surprising that the aliphatic polyketone compound according to the invention does not break during deformation loading, as occurs, for example, when a rigid piston seal is installed in a piston chamber by means of mounting pliers, while structurally identical seals made of a commercial polyketone compound modified with 20 wt % PTFE break at the weld line in 75 to 90% of the installation tests. The improved weld line strength can presumably be explained by the proportion of tribological additive which is lower by 5 to 19.5 wt %, preferably 12 to 18 wt %, and in particular 12.5 to 15 wt %. It is surmised that during the injection molding of seals with only one injection point, the rather apolar tribological additives migrate to the interface between polar polyketone and mold wall during the injection process. Therefore, a particularly high concentration of these additives is present in the region of the weld line where the two flow fronts converge, which, in the commercial polyketone compounds modified with 20 wt % PTFE, leads to adhesion problems and hence to subsequent weld line breakages. The polyketone compounds according to the invention, which have less than 15 wt % ultra-high molecular weight polyethylene do not exhibit this problem due to the lower additive content.

Thus, in a preferred embodiment of the invention, the aliphatic polyketone according to the invention has a total proportion of tribological additives, i.e. of ultra-high molecular weight polyethylene and optionally further tribological additives present, such as silicone oils, PTFE powder, graphite, molybdenum sulfide, boron nitride, of less than 20 wt %, preferably of less than 5 wt % and in particular of less than 2.5 wt %. Nevertheless, the above-mentioned additives may be present, for example in quantities of 0.1 wt % to 19.5 wt %.

An ultra-high molecular weight polyethylene, often abbreviated to UHMWPE, is to be understood according to the invention as meaning polyethylene having a molecular weight of greater than 1.0 million g/mol, preferably from 3.0 to 7.0 million g/mol and in particular from 3.0 to 5.0 million g/mol, measured by means of Ubbelohde viscometry (dilute solution in decahydronaphthalene at 140° C.). Due to this high molecular weight, ultra-high molecular weight polyethylene is not fusible. This is advantageous compared to fusible plastics, such as LDPE or HDPE, since UHMWPE does not itself melt on compounding into an aliphatic polyketone melt, but continues to be present in the polymer matrix in the form of solid particles. The UHMWPE particles are apolar, therefore incompatible with the polar aliphatic polyketone matrix, and therefore accumulate at the interfaces. As a result, the surface of the polyketone compounds has wear-resistant particles which, on the one hand, reduce friction resistance and, on the other hand, reduce material abrasion.

In contrast to UHMWPE, LDPE and HDPE are fusible polyethylenes having melting ranges around approximately 110° C. and around approximately 135° C., respectively, which completely melt on mixing into an aliphatic polyketone melt, are distributed in the polymer matrix and thereby form a blend (as described for example in DE 695 13 864 T2, WO 96/06889). In this case, discrete PE particles are no longer present in the finished material blend, and so the advantages mentioned in the previous paragraph afforded by the solid UHMWPE particles cannot be achieved.

Furthermore, due to the significantly higher molecular weight and the higher intermolecular interactions associated therewith, UHMWPE has a significantly better wear resistance and impact strength than LDPE and HDPE.

Ultra-high molecular weight polyethylene can be recovered from monomeric ethylene by metallocene-catalyzed synthesis, with polymer chains consisting of from 100,000 to 250,000 monomeric units typically being formed. Thus, according to the invention, preference is given to ultra-high molecular weight polyethylene which has polymer chains consisting of from 100,000 to 250,000 monomeric units.

Preferably, the average particle size of the ultra-high molecular weight polyethylene is in the range from 10 µm to 300 µm, more preferably from 20 µm to 50 µm and in particular is 38 µm. In a further preferred embodiment, the particles of the ultra-high molecular weight polyethylene are smaller than 75 µm. Thus, the D50 value of the polyethylene is preferably less than 75 µm and/or the D95 is preferably less than 75 µm. The specific density of the ultra-high molecular weight polyethylene is preferably 0.93 to 0.94 g/cm$^3$. The bulk density is preferably 0.3 to 0.6 g/cm$^3$ and more preferably 0.32 to 0.5 g/cm$^3$. The molar weight is preferably 3.0 to 7.0 million g/mol and more preferably 3.0 to 5.0 million g/mol.

According to the invention, aliphatic polyketone and ultra-high molecular weight polyethylene are the main constituents of the aliphatic polyketone compound of the invention. In this case, according to the invention, the proportion of aliphatic polyketone in the polyketone compound is 85.0 to 99.5 wt %, preferably 90.0 to 99.5 wt %, more preferably 92.0 to 98.0 wt % and in particular 92.5 to 95.0 wt %, in each case based on the total weight of the polyketone compound. Furthermore, according to the invention, the proportion of ultra-high molecular weight polyethylene in the polyketone compound is 0.5 to 15 wt %, preferably from 0.5 to 10 wt %, more preferably from 2.0 to 8.0 wt % and in particular from 5.0 to 7.5 wt %, in each case based on the total weight of the polyketone compound.

In a preferred embodiment of the invention, the aliphatic polyketone has a proportion of further tribological additives, for example of silicone oils, of 0.1 wt % to 2.0 wt %, in particular 0.5 wt % to 1.5 wt %.

In a preferred embodiment of the invention, the aliphatic polyketone has a melting point, measured according to the method of DIN EN 11357-1, of 210 to 230° C. and in particular of 220 to 222° C. The glass transition point is in the range from 5° C. to 20° C., preferably 10° C. to 15° C. and in particular 11° C. to 13° C. The density of the aliphatic polyketone, measured according to the method of ISO 1183, is preferably in the range from 1.1 t0 1.3 g/cm$^3$ and is in particular 1.24 g/cm$^3$. The moisture absorption of the aliphatic polyketone, as measured according to the method of ISO 1110, is from 0.3 to 1.2% and in particular from 0.8 to 0.9%, at 70° C. and 62% RH. The MVR thereof, measured according to the method of ISO 1133, is preferably in the range from 2 to 80 cm$^3$/10 min and in particular in the range from 6 to 60 cm$^3$/10 min at 240° C. and 2.16 kg of test weight.

In a preferred embodiment of the invention, the aliphatic polyketone is a terpolymer, preferably produced from ethylene, carbon monoxide and an alkene having from 3 to 5 carbon atoms, preferably propylene and/or butylene, in particular propylene. Here, the arrangement of carbon monoxide and olefin in the polymeric chain takes place in a strictly alternating manner.

In a preferred embodiment of the invention, the aliphatic polyketone has a mean molecular weight $M_n$ (number-average molecular weight) of between 60,000 and 100,000 and/or $M_w$ (weight-average molecular weight) of between 132,000 and 320,000. The polydispersity index here is preferably between 2.2 and 3.2.

The polyketone compound according to the invention may contain silicone oil and other liquid or solid lubricants. Furthermore, further customary polymer additives such as, inter alia, aging inhibitors, fillers, flame retardants and pigments, as well as other polymeric materials, may be included in order to improve or otherwise alter the properties of the composition. The content of liquid lubricants, such as silicone oils, is preferably from 0.0 to 2.0 wt % and particularly preferably 0.0 to 1.5 wt % and in particular 0.0 to 1.0 wt %.

In a preferred embodiment of the invention, the aliphatic polyketone compound has a coefficient of friction µ, measured on a Lewis test bench at a speed of v=0.84 m/s, a pressure of p=0.84 MPa and in the unlubricated state, of from 0.1 to 0.4, more preferably from 0.1 to 0.3 and in particular from 0.1 to 0.25. Furthermore, in a preferred embodiment of the invention, the aliphatic polyketone has an average wear coefficient, measured on a Lewis test bench at a speed of v=0.84 m/s, a pressure of p=0.84 MPa and in the unlubricated state, of from $1*10^{-7}$ to $1*10^{-4}$ mm$^3$/Nm and more preferably from $1*10^{-7}$ to $1*10-5$ mm$^3$/Nm.

Moreover, the aliphatic polyketone compound according to the invention preferably has a tensile modulus of elasticity, measured according to DIN EN ISO 527-2/1A/50, of 1600 MPa to 1850 MPa, a tensile strength, measured according to DIN EN ISO 527-2/1A/50, of 55 MPa to 65 MPa and/or an elongation at break, measured according to DIN EN ISO 527-2/1A/50, of 20% to 40%.

Furthermore, the aliphatic polyketone compound according to the invention, in a tribological test as described in example 2, preferably has a coefficient of friction of p=0.38 to 0.42 over the entire duration of the test, a coefficient of friction of p=0.38 to 0.40 over the "steady state", a wear coefficient of $10*10^{-6}$ to $20*10^{-6}$ over the entire duration of the test and/or a wear coefficient of $2*10^{-6}$ to $5*10^{-6}$ over the "steady state".

A further subject matter of the present invention is a method for producing the aliphatic polyketone compound, comprising combining 99.5 to 85.0 wt % aliphatic polyketone with 0.5 to 15 wt % ultra-high molecular weight polyethylene, more preferably 98.0 to 92.0 wt % aliphatic polyketone with 2.0 to 8.0 wt % ultra-high molecular weight polyethylene, and in particular 95.0 to 92.5 wt % aliphatic polyketone with 5.0 to 7.5 wt % ultra-high molecular weight polyethylene. The weight data here relate to the total weight of the aliphatic polyketone compound.

The components of the aliphatic polyketone compounds are preferably combined by means of extrusion technology. Extruders used here are preferably co-rotating twin-screw extruders, but counter-rotating twin-screw extruders, planetary roller extruders and co-kneaders are also used. Single-screw extruders are more suitable for conveying and not for compounding and are therefore less suitable for the production of the aliphatic polyketone compounds according to the invention. In one embodiment, aliphatic polyketone is pre-dried at 70° C. to 90° C. for a period of four hours and metered into a twin screw extruder by means of a metering device, preferably a gravimetric metering device. The temperature of the feed zone here is preferably in the range from 50° C. to 100° C., while the temperature of the extruder zones is preferably 225° C. to 254° C. The ultra-high molecular weight polyethylene is preferably supplied to the polymer melt via a further metering device, preferably a gravimetric metering device. After exiting the extruder nozzle, the strand is preferably deposited on a conveyor belt and cooled by means of water and/or air before it is comminuted in a downstream granulator. It is advantageous to dry the granules produced in order to remove the moisture introduced by the cooling process.

According to the invention, aliphatic polyketone and ultra-high molecular weight polyethylene are combined with one another and the further optionally present components in such a proportion that they form the main constituents of the aliphatic polyketone compound. The polyketone is preferably supplied to the compound in a quantity of 99.5 to 90.0 wt %, more preferably from 98.0 to 92.0 wt % and in particular from 95.0 to 92.5 wt %. Furthermore, the ultra-high molecular weight polyethylene is preferably supplied to the compound in a quantity of 0.5 to 10.0 wt %, more preferably from 2.0 to 8.0 wt % and in particular from 5.0 to 7.5 wt %. Quantities below 10 wt % ultra-high molecular weight polyethylene are advantageous since clogging of the extruder nozzles can thus be prevented in a particularly simple manner.

This is because ultra-high molecular weight polyethylene tends to agglomerate, accumulate in the region of the extruder nozzle and clog it. However, compounds having more than 10 wt % ultra-high molecular weight polyethylene can also be produced with the method described above, in particular in small batches, but it is advantageous to take special technical precautions for continuous production on account of the agglomeration of UHMWPE and the associated clogging of the extruder nozzle.

The aliphatic polyketone compound according to the invention can be processed by conventional shaping methods, such as extrusion, compression molding and injection molding, to give various products which are particularly suitable for applications requiring good tribological properties.

A further subject matter of the present invention is molded bodies, preferably rotationally symmetrical molded bodies, in particular seals, such as rod and/or piston seals, structural parts (with and/or without a sealing function), wiper elements, coupling elements, baking rings (anti-extrusion rings), wear bands and/or guides, which contain the polyketone compound according to the invention.

In a preferred embodiment, the molding body has a weld line strength of greater than 120 N in a bending test as described in example 2. Furthermore, the molded body preferably does not break on the weld line in a bending test with maximum crosshead travel (43.31 mm), as described in example 2.

The aliphatic polyketone compound according to the invention is particularly suitable for molded bodies which are produced by means of injection molding methods, in particular by means of injection molding methods using only one injection point, for example pin-point or tunnel gates.

The invention further relates to the use of the aliphatic polyketone compound according to the invention for the production of molded bodies, preferably of rotationally symmetrical molded bodies, in particular seals such as rod and/or piston seals, structural parts (with and/or without sealing function), wiper elements, coupling elements, toothed wheels, sliding bearings, baking rings, in particular anti-extrusion rings, wear bands and/or guides.

The invention is explained in more detail below using examples.

Example 1: Production of a Polyketone Compound According to the Invention

A tribologically modified polyketone compound according to the invention was produced on a 27 mm twin-screw extruder from Leistritz of the ZSE 27 iMAXX type (screw diameter: 28.3 mm, channel depth: 5.6 mm (no clearance), $D_a/D_i=1.66$, maximum torque: 256 Nm, screw speed: 600-1200 rpm), equipped with a solids metering device from SCHOLZ Dosiertechnik GmbH of the BASIC 401 type for metering the aliphatic polyketone, a solids metering device from SCHOLZ Dosiertechnik GmbH of the BASIC 300 type for metering the ultra-high molecular weight polyethylene, a conveyor belt for strand deposition, water cooling for cooling the deposited polymer strand and a downstream granulator from Maag Automatik GmbH of the PRIMO 60E type for comminuting the deposited strand.

AKROTEK® PK-VM natural (4774) from AKROPLASTIC GmbH was used as aliphatic polyketone. AKROTEK® PK-VM natural (4774) is a non-reinforced polyketone type with high flowability. The melting point thereof, measured according to the method of DIN EN 11357-1, is 220° C., the density thereof, measured according to the method of ISO 1183, is 1.24 g/cm$^3$, the moisture absorption thereof, measured according to the method of ISO 1110, at 70° C. and 62% RH, is between 0.8 and 0.9% and the MVR thereof, measured according to the method of ISO 1133, is 60 cm$^3$/10 min.

INHANCE UH-1700 from Nordmann Rassmann was used as ultra-high molecular weight polyethylene. The mean particle size of the UHMWPE particles is 38 μm and all particles are smaller than 75 μm. INHANCE UH-1700 is a UHMWPE type with surface-treated particles to allow better dispersibility and better adhesion of same in the surrounding polymer. The material has a specific density of 0.93 to 0.94 g/cm$^3$, a bulk density of 0.32 to 0.5 g/cm$^3$ and a molar weight of 3.0 to 5.0 million g/mol.

The aliphatic polyketone was conveyed into the feed zone of the extruder by means of the solids metering device of BASIC 401 type. The temperature of the feed zone was set at 50° C. The twelve heating zones of the extruder were set at temperatures in the range from 230° C. to 245° C. The temperature of the nozzle was 230° C. The measured melt temperature of the polymer was 238° C. The overall throughput of material was 19.97 kg/h. The throughput of AKROTEK® PK-VM was 18.97 kg/h, the throughput of Inhance UH-1700 was 1.0 kg/h. The finished compound was discharged via a single-jet nozzle onto the conveyor belt, cooled with spray water and supplied to the granulator. Since the granules still contain much adherent residual moisture as a result of cooling with water, they were dried at 80° C. for 30 to 45 minutes.

Prior to extruding the compound to give test specimens, the granules were again dried for four hours at 80° C.

Example 2: Mechanical and Tribological Tests of the Polyketone Compound from Example 1

Test specimens for the mechanical and tribological tests were produced on an injection molding machine from Arburg GmbH & Co. KG of the 320C 600-100 Allrounder type. An AIM™ Quick Change Mold from Axxicon Moulds was used as injection mold. S1A tensile bars were produced for mechanical tests and Lewis test specimens were produced for tribological tests.

The results of mechanical tests on the compound gave a tensile modulus of elasticity, measured according to DIN EN ISO 527-2/1A/50, of 1725±10 MPa, a tensile strength, measured according to DIN EN ISO 527-2/1A/50, of 58.7±0.2 MPa and an elongation at break, measured according to DIN EN ISO 527-2/1A/50, of 28.2±7.1%.

The tribological tests were carried out on a Lewis test bench from Lewis Research Inc. of LRI-1a type. A D2 steel/52100 with the chemical composition 100Cr6 served as counterface. The test was conducted in the unlubricated state. The speed was v=0.84 m/s and the contact pressure p was 0.84 MPa. Both parameters were chosen such that the temperature in the continuous operation state was between 54° C. and 58° C. Under these test conditions, the compound exhibited a coefficient of friction of $\mu=0.275$ over the entire duration of the test, a coefficient of friction of $\mu=0.269$ over the "steady state", a wear coefficient of $6.556*10-6$ over the entire duration of the test and a wear coefficient of $1.862*10-6$ over the "steady state". For comparison to the compound according to the invention, the PTFE-modified AKROTEK® PK-VM™ and the unmodified AKROTEK® PK-VM were measured. Under analogous test conditions, the unmodified AKROTEK® PK-VM exhibited a coefficient of friction of $\mu=0.412$ over the entire duration of the test, a coefficient of friction of $\mu=0.390$ over the "steady state", a wear coefficient of $15.641*10-6$ over the entire duration of the test and a wear coefficient of $3.814*10-6$ over the "steady state". Under analogous test conditions, the tribologically modified AKROTEK® PK-VM™ exhibited a coefficient of friction of $\mu=0.221$ over the entire duration of the test, a coefficient of friction of $\mu=0.214$ over the "steady state", a wear coefficient of $2.087*10-6$ over the entire duration of the test and a wear coefficient of $1.670*10-6$ over the "steady state". It is clear that, although the PTFE-modified benchmark AKROTEK® PK-VM™, with 20 wt % PTFE, contains considerably more tribological additives than the compound according to the invention (5 wt % tribological additive), it only performs slightly better.

Figure 1:
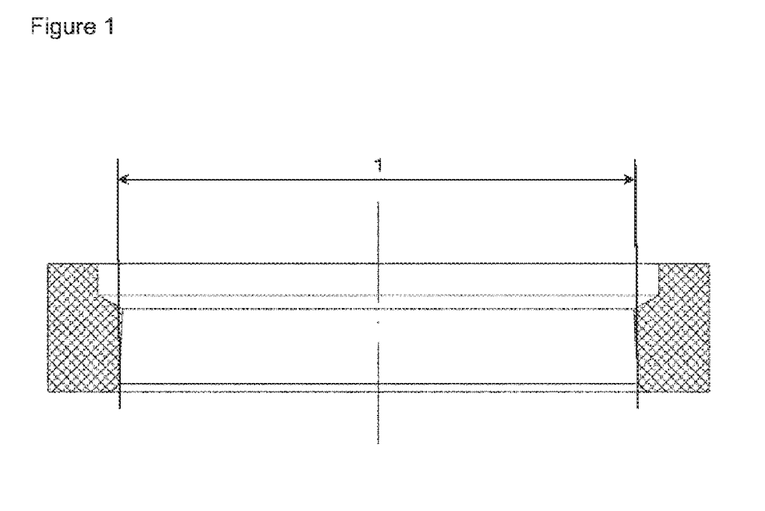
FIG. 1 is a diagram of a polyketone terpolymer.

To evaluate the weld line strength, five rod seals of the geometry shown in FIG. 1 (1: rod diameter of 50 mm) were produced from the compound produced in example 1 using the injection molding method with only one injection point and were subsequently subjected to a bending test. The seals were each arranged in experimental equipment in such a way that the weld line and the injection point opposite thereto were aligned horizontally and the compression die (diameter of the punch: 25 mm) applied pressure to the seal at an angle of 90° to the weld line and injection point. One contact point was used. The compression dies were loaded with an initial load of 5 N and were subsequently run at 5 mm/minute. The maximum crosshead travel was 43.3 cm. The tribologically modified polyketone compound produced in example 1 exhibited no breakage at the weld line in this experimental setup. In all five rod seals tested, the compression die was moved to the maximum crosshead travel without a seal breaking (see table 1).

TABLE 1

Results of the bending tests on rod seals produced from the polyketone compound according to the invention described in example 1.

| No.: | F1 mm: | F2 mm: | F3 mm: | F4 mm: | F max: | Max travel: | Observation: |
|---|---|---|---|---|---|---|---|
| 1 | 12.31 N | 19.12 N | 25.25 N | 30.65 N | 124.8 N | 42.97 mm | Ring not broken |
| 2 | 12.35 N | 19.31 N | 25.57 N | 31.06 N | 113.2 N | 43.31 mm | Ring not broken |
| 3 | 12.45 N | 19.37 N | 25.59 N | 31.03 N | 121.7 N | 43.30 mm | Ring not broken |
| 4 | 12.39 N | 19.32 N | 25.55 N | 31.00 N | 114.9 N | 32.29 mm | Ring not broken |
| 5 | 12.29 N | 19.20 N | 25.41 N | 30.87 N | 113.3 N | 43.29 mm | Ring not broken |

In comparison to the polyketone compound according to the invention, rod seals made of a commercially available polyketone compound friction-modified with approximately 20 wt % PTFE were tested under analogous test conditions. Of four rod seals tested, three broke after a crosshead travel of 32.3 to 35.4 mm and a compressive force of 96.7 to 105.4 N (see table 2).

TABLE 2

Results of the bending tests on rod seals produced from commercially available AKROTEK ® PK-VM TM with the approximately 20 wt % modified polyketone compound.

| No.: | F1 mm: | F2 mm: | F3 mm: | F4 mm: | F max: | Max travel: | Observation: |
|---|---|---|---|---|---|---|---|
| 1 | 12.47 N | 19.20 N | 25.20 N | 30.36 N | 96.7 N | 32.34 mm | Ring broken |
| 2 | 12.30 N | 19.04 N | 25.03 N | 30.25 N | 112.8 N | 43.16 mm | Ring not broken |
| 3 | 12.42 N | 19.21 N | 25.22 N | 30.45 N | 105.4 N | 35.36 mm | Ring broken |
| 4 | 9.60 N | 16.74 N | 23.13 N | 28.71 N | 103.3 N | 34.20 mm | Ring broken |

Figure 2:
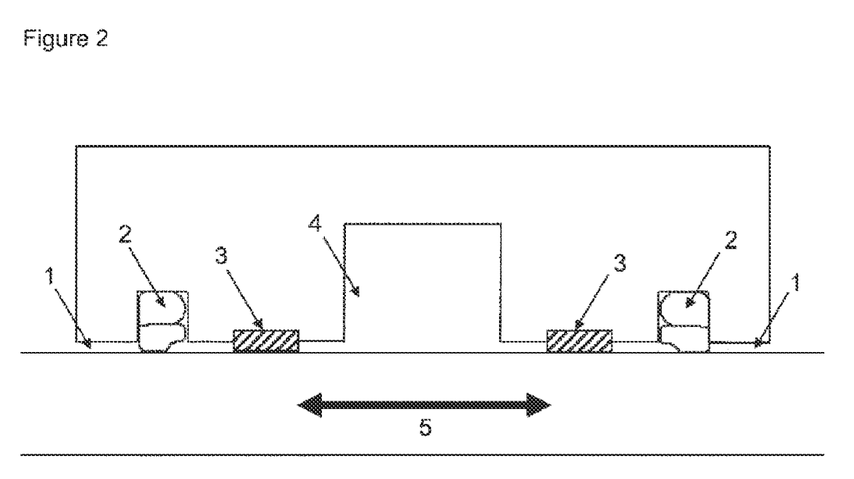
FIG. 2 is a diagram of a hydraulic test bench, including the following components: Extrusion gap (1), test seal (2), guide (3), and pressure chamber (4). The rod movement (5) is horizontal.

Furthermore, the rod seals made of the compound according to the invention were tested several times on a hydraulic test bench under application-oriented conditions against the current benchmark, a rod seal made of a PTFE/bronze compound. A diagram of the test bench is shown in FIG. 2. The test bench has the following components: Extrusion gap (1), test seal (2), guide (3), pressure chamber (4). The rod movement (5) is horizontal. The settings of the test bench were as follows:

Stroke 400 mm
Speed 0.3 m/s
Pressure 400 bar (40 MPa)
Temperature 100° C.
Test duration 50,000 double strokes
Oil Shell Tellus 46

Leakage and extrusion stability were evaluated in continuous use. It was clear here that the PTFE/bronze compound is damaged after approximately 40,000 strokes due to gap extrusion, whereupon the leakage more than quadruples to the end of the run time after 50,000 strokes, from 20 drops to 90 drops. The seals made from the polyketone compound according to the invention, produced according to the description from example 1, is extrusion stable over the whole run time of 50,000 strokes (approximately 20 drops of leakage up to the end).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An aliphatic polyketone compound comprising:
    85.0 to 98.0 wt % aliphatic polyketone; and
    2.0 to 8.0 wt % ultra-high molecular weight polyethylene;
    wherein a D50 value of the ultra-high molecular weight polyethylene is less than 75 μm.

2. The aliphatic polyketone compound of claim 1, wherein the ultra-high molecular weight polyethylene has a molecular weight greater than 1.0 million g/mol.

3. The aliphatic polyketone compound of claim 1, wherein the ultra-high molecular weight polyethylene has an average particle size in the range from 10 μm to 300 μm.

4. The aliphatic polyketone compound according to of claim 1, wherein the aliphatic polyketone has at least one of a melting point, measured according to DIN EN 11357-1, of 210 to 230° C., a glass transition point in a range from 5° C. to 20° C., a density in a range from 1.1 to 1.3 g/cm³, a moisture absorption of 0.3 to 1.2%, or an MVR in a range from 2 to 80 cm³/10 min.

5. The aliphatic polyketone compound of claim 1, wherein the aliphatic polyketone comprises a terpolymer.

6. The aliphatic polyketone compound of claim 1, wherein the aliphatic polyketone is produced from ethylene, carbon monoxide, and an alkene having from 3 to 5 carbon atoms.

7. The aliphatic polyketone compound of claim 1, wherein, during production thereof, the arrangement of carbon monoxide and olefin in a polymeric chain takes place in a strictly alternating manner.

8. The aliphatic polyketone compound of claim 1, wherein the aliphatic polyketone has at least one of a mean molecular weight Mn (number-average molecular weight) of between 60,000 and 100,000 or an Mw (weight-average molecular weight) of between 132,000 and 320,000.

9. A method for producing an aliphatic polyketone compound, comprising:
    combining 98.0 to 85.0 wt % aliphatic polyketone with 2.0 to 8.0 wt % ultra-high molecular weight polyethylene; wherein the D50 value of the ultra-high molecular weight polyethylene is less than 75 μm.

10. A molded body, comprising:
    at least one of seals, wiper elements, coupling elements, baking rings (anti-extrusion rings), wear bands, guides, or structural parts,
    wherein the molded body contains the aliphatic polyketone compound according to claim 1.

11. The molded body of claim 10, wherein the molded body comprises a rotationally symmetrical molded body.

12. The molded body of claim 10, wherein the molded body comprises an injection molded part having only one injection point.

13. A method, comprising:
    using the aliphatic polyketone compound of claim 1 to produce molded bodies,
    wherein the molded bodies comprise at least one of seals, rod seals, piston seals, structural parts (with and/or without sealing function), wiper elements, coupling elements, toothed wheels, sliding bearings, baking rings, anti-extrusion rings, wear bands, or guides.

14. The method of claim 13, wherein the molded bodies comprise injection molded parts each having only one injection point.

15. The aliphatic polyketone compound of claim 1, wherein the ultra-high molecular weight polyethylene is 5.0 to 7.5 wt %.

16. The aliphatic polyketone compound of claim 2, wherein the molecular weight is from 3.0 to 7.0 million g/mol.

17. The aliphatic polyketone compound of claim 6, wherein the alkene having from 3 to 5 carbon atoms comprises propylene.

18. The aliphatic polyketone compound of claim 4, wherein the aliphatic polyketone has a density of 1.24 g/cm³.

19. The aliphatic polyketone compound of claim 8, wherein the aliphatic polyketone has a polydispersity index between 2.2 and 3.2.

* * * * *